(12) United States Patent
Brezina et al.

(10) Patent No.: US 10,200,321 B2
(45) Date of Patent: Feb. 5, 2019

(54) PRESENTATION OF ORGANIZED PERSONAL AND PUBLIC DATA USING COMMUNICATION MEDIUMS

(71) Applicant: OATH INC., New York, NY (US)

(72) Inventors: Matthew Brezina, San Francisco, CA (US); Adam Smith, San Francisco, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 15/440,527

(22) Filed: Feb. 23, 2017

(65) Prior Publication Data

US 2017/0171124 A1    Jun. 15, 2017

Related U.S. Application Data

(62) Division of application No. 12/348,870, filed on Jan. 5, 2009, now Pat. No. 9,584,343.
(Continued)

(51) Int. Cl.
*G06F 17/30* (2006.01)
*G06Q 10/10* (2012.01)
(Continued)

(52) U.S. Cl.
CPC ........ *H04L 51/08* (2013.01); *G06F 17/30867* (2013.01); *G06Q 10/107* (2013.01);
(Continued)

(58) Field of Classification Search
CPC ....... H04L 51/08; H04L 67/306; H04L 51/04; G06Q 30/0256; G06F 17/30867; H04W 4/14
See application file for complete search history.

(56) References Cited

U.S. PATENT DOCUMENTS 5,396,647 A    3/1995 Thompson et al.
5,610,915 A    3/1997 Elliott et al.
(Continued)

FOREIGN PATENT DOCUMENTS

CN    101351818    1/2009
EP        944002    9/1999
(Continued)

OTHER PUBLICATIONS

European Patent Application No. 10797483.4, extended European Search Report, dated Dec. 20, 2016.
(Continued)

*Primary Examiner* — John M MacIlwinen
(74) *Attorney, Agent, or Firm* — James J. DeCarlo; Greenberg Traurig, LLP

(57) ABSTRACT

Systems, methods and computer program products for providing information associated with an attachment (e.g., attachment received through an instant message system, online collaboration tool, electronic message and the like). A sidebar may allow a user to view comprehensive profile and content information associated with the attachment using an attachment information viewer. The sidebar also may allow the user to switch between a message attachment information view (e.g., to facilitate browsing of the document or attachment) and a person profile information view (e.g., to facilitate browsing of personal or public data).

15 Claims, 4 Drawing Sheets

Related U.S. Application Data

(60) Provisional application No. 61/018,883, filed on Jan. 3, 2008.

(51) Int. Cl.
  *H04L 12/58* (2006.01)
  *G06Q 30/02* (2012.01)
  *H04L 29/08* (2006.01)
  *H04W 4/14* (2009.01)

(52) U.S. Cl.
  CPC ......... *G06Q 30/0256* (2013.01); *H04L 51/04* (2013.01); *H04L 67/306* (2013.01); *H04W 4/14* (2013.01)

(56) References Cited

U.S. PATENT DOCUMENTS

| | | | |
|---|---|---|---|
| 5,966,714 A | 10/1999 | Huang et al. | |
| 6,020,884 A | 2/2000 | MacNaughton et al. | |
| 6,154,205 A | 11/2000 | Carroll et al. | |
| 6,285,999 B1 | 9/2001 | Page | |
| 6,385,644 B1 | 5/2002 | Devine et al. | |
| 6,405,197 B2 | 6/2002 | Gilmour | |
| 6,484,196 B1 | 11/2002 | Maurille | |
| 6,510,453 B1 | 1/2003 | Apfel et al. | |
| 6,546,393 B1 | 4/2003 | Khan | |
| 6,560,620 B1 | 5/2003 | Ching | |
| 6,594,654 B1 | 7/2003 | Salam et al. | |
| 6,615,348 B1 | 9/2003 | Gibbs | |
| 6,714,967 B1 * | 3/2004 | Horvitz | G06Q 10/107 370/265 |
| 6,721,748 B1 | 4/2004 | Knight et al. | |
| 6,832,245 B1 | 12/2004 | Isaacs et al. | |
| 6,931,419 B1 | 8/2005 | Lindquist | |
| 6,952,805 B1 | 10/2005 | Tafoya et al. | |
| 6,965,918 B1 | 11/2005 | Arnold et al. | |
| 6,996,777 B2 | 2/2006 | Hiipakka | |
| 7,003,724 B2 | 2/2006 | Newman | |
| 7,058,892 B1 | 6/2006 | MacNaughton et al. | |
| 7,076,533 B1 | 7/2006 | Knox et al. | |
| 7,085,745 B2 | 8/2006 | Klug | |
| 7,103,806 B1 | 9/2006 | Horvitz | |
| 7,181,518 B1 | 2/2007 | Matsumoto et al. | |
| 7,185,065 B1 | 2/2007 | Holtzman et al. | |
| 7,237,009 B1 | 6/2007 | Fung et al. | |
| 7,246,045 B1 | 7/2007 | Rappaport et al. | |
| 7,289,614 B1 | 10/2007 | Twerdahl et al. | |
| 7,328,242 B1 | 2/2008 | McCarthy et al. | |
| 7,333,976 B1 | 2/2008 | Auerbach et al. | |
| 7,359,894 B1 | 4/2008 | Liebman et al. | |
| 7,383,307 B2 | 6/2008 | Kirkland et al. | |
| 7,444,323 B2 | 10/2008 | Martinez et al. | |
| 7,454,464 B2 | 11/2008 | Puthenkulam et al. | |
| 7,475,109 B1 | 1/2009 | Fletcher et al. | |
| 7,475,113 B2 | 1/2009 | Stolze | |
| 7,512,788 B2 | 3/2009 | Choi et al. | |
| 7,512,814 B2 | 3/2009 | Chen et al. | |
| 7,536,384 B2 | 5/2009 | Venkataraman et al. | |
| 7,539,676 B2 | 5/2009 | Aravamudan et al. | |
| 7,580,363 B2 | 8/2009 | Sorvari et al. | |
| 7,593,995 B1 | 9/2009 | He et al. | |
| 7,606,860 B2 | 10/2009 | Puthenkulam et al. | |
| 7,620,407 B1 | 11/2009 | Donald et al. | |
| 7,624,103 B2 | 11/2009 | Wiegering et al. | |
| 7,627,598 B1 | 12/2009 | Burke | |
| 7,634,463 B1 | 12/2009 | Katragadda et al. | |
| 7,639,157 B1 | 12/2009 | Whitley et al. | |
| 7,653,695 B2 | 1/2010 | Flury et al. | |
| 7,685,144 B1 | 3/2010 | Katragadda | |
| 7,692,653 B1 | 4/2010 | Petro et al. | |
| 7,698,140 B2 | 4/2010 | Bhardwaj et al. | |
| 7,702,730 B2 | 4/2010 | Spataro et al. | |
| 7,707,249 B2 | 4/2010 | Spataro et al. | |
| 7,707,509 B2 | 4/2010 | Naono et al. | |
| 7,716,140 B1 | 5/2010 | Nielsen et al. | |
| 7,720,916 B2 | 5/2010 | Fisher et al. | |
| 7,724,878 B2 | 5/2010 | Timmins et al. | |
| 7,725,492 B2 | 5/2010 | Sittig et al. | |
| 7,730,010 B2 | 6/2010 | Kishore et al. | |
| 7,743,051 B1 | 6/2010 | Kashyap et al. | |
| 7,752,081 B2 | 7/2010 | Calabria | |
| 7,756,895 B1 | 7/2010 | Emigh | |
| 7,756,935 B2 | 7/2010 | Gaucas | |
| 7,761,436 B2 | 7/2010 | Norton et al. | |
| 7,788,260 B2 | 8/2010 | Lunt et al. | |
| 7,805,492 B1 | 9/2010 | Thatcher et al. | |
| 7,818,396 B2 | 10/2010 | Dolin et al. | |
| 7,827,208 B2 | 11/2010 | Bosworth et al. | |
| 7,827,265 B2 | 11/2010 | Cheever et al. | |
| 7,831,676 B1 | 11/2010 | Nagar | |
| 7,831,692 B2 | 11/2010 | French et al. | |
| 7,836,045 B2 | 11/2010 | Schachter | |
| 7,836,132 B2 | 11/2010 | Qureshi et al. | |
| 7,836,134 B2 | 11/2010 | Pantalone | |
| 7,849,141 B1 | 12/2010 | Bellegarda et al. | |
| 7,849,142 B2 | 12/2010 | Clegg et al. | |
| 7,853,602 B2 | 12/2010 | Gorti et al. | |
| 7,853,881 B1 | 12/2010 | Aly Assal et al. | |
| 7,865,562 B1 | 1/2011 | Nesbitt et al. | |
| 7,870,197 B2 | 1/2011 | Lewis et al. | |
| 7,899,806 B2 | 3/2011 | Aravamudan et al. | |
| 7,899,871 B1 | 3/2011 | Kumar et al. | |
| 7,908,647 B1 | 3/2011 | Polis et al. | |
| 7,925,690 B2 | 4/2011 | Smith et al. | |
| 7,930,430 B2 | 4/2011 | Thatcher et al. | |
| 7,949,611 B1 | 5/2011 | Nielsen et al. | |
| 7,949,627 B2 | 5/2011 | Aravamudan et al. | |
| 7,970,832 B2 | 6/2011 | Perry, Jr. et al. | |
| 7,979,569 B2 | 7/2011 | Eisner et al. | |
| 7,991,764 B2 | 8/2011 | Rathod | |
| 7,996,456 B2 | 8/2011 | Gross | |
| 8,005,806 B2 | 8/2011 | Rupp et al. | |
| 8,028,032 B2 | 9/2011 | Laird-McConnell | |
| 8,055,715 B2 | 11/2011 | Bensky et al. | |
| 8,073,928 B2 | 12/2011 | Dolin et al. | |
| 8,086,676 B2 | 12/2011 | Palahnuk et al. | |
| 8,086,968 B2 | 12/2011 | McCaffrey et al. | |
| 8,140,566 B2 | 3/2012 | Boerries et al. | |
| 8,145,791 B2 | 3/2012 | Thatcher et al. | |
| 8,151,358 B1 | 4/2012 | Herold | |
| 8,161,122 B2 | 4/2012 | Sood et al. | |
| 8,200,761 B1 | 6/2012 | Tevanian | |
| 8,200,808 B2 | 6/2012 | Ishida | |
| 8,204,897 B1 | 6/2012 | Djabarov et al. | |
| 8,239,197 B2 | 8/2012 | Webb et al. | |
| 8,244,848 B1 | 8/2012 | Narayanan et al. | |
| 8,284,783 B1 | 10/2012 | Maufer et al. | |
| 8,291,019 B1 | 10/2012 | Rochelle et al. | |
| 8,296,179 B1 | 10/2012 | Rennison | |
| 8,316,315 B2 | 11/2012 | Portnoy et al. | |
| 8,363,803 B2 | 1/2013 | Gupta | |
| 8,365,235 B2 | 1/2013 | Hunt et al. | |
| 8,392,409 B1 | 3/2013 | Kashyap et al. | |
| 8,392,836 B1 | 3/2013 | Bau et al. | |
| 8,412,174 B2 | 4/2013 | Khosravi | |
| 8,423,545 B2 | 4/2013 | Cort et al. | |
| 8,433,762 B1 | 4/2013 | Wald et al. | |
| 8,443,441 B2 | 5/2013 | Stolfo et al. | |
| 8,463,872 B2 | 6/2013 | Pounds et al. | |
| 8,468,168 B2 | 6/2013 | Brezina et al. | |
| 8,495,045 B2 | 7/2013 | Wolf et al. | |
| 8,510,389 B1 | 8/2013 | Gurajada et al. | |
| 8,522,257 B2 | 8/2013 | Rupp et al. | |
| 8,549,412 B2 | 10/2013 | Brezina et al. | |
| 8,600,343 B2 | 12/2013 | Brezina et al. | |
| 8,606,335 B2 | 12/2013 | Ozaki | |
| 8,620,935 B2 | 12/2013 | Rubin et al. | |
| 8,661,002 B2 | 2/2014 | Smith et al. | |
| 8,666,035 B2 | 3/2014 | Timmins et al. | |
| 8,694,633 B2 | 4/2014 | Mansfield et al. | |
| 8,717,933 B2 | 5/2014 | Fisher et al. | |
| 8,745,060 B2 | 6/2014 | Brezina et al. | |
| 8,754,848 B2 | 6/2014 | Holzer et al. | |

(56) References Cited

U.S. PATENT DOCUMENTS

| | | |
|---|---|---|
| 8,793,625 B2 | 7/2014 | Rhee et al. |
| 8,819,234 B1 | 8/2014 | Bauer et al. |
| 8,849,816 B2 | 9/2014 | Burba et al. |
| 8,850,343 B2 | 9/2014 | Klassen et al. |
| 8,972,257 B2 | 3/2015 | Bonforte |
| 8,982,053 B2 | 3/2015 | Holzer et al. |
| 8,984,074 B2 | 3/2015 | Monaco |
| 8,990,323 B2 | 3/2015 | Hein et al. |
| 9,020,938 B2 | 4/2015 | Cort et al. |
| 9,058,366 B2 | 6/2015 | Brezina et al. |
| 9,087,323 B2 | 7/2015 | Hein et al. |
| 9,159,057 B2 | 10/2015 | Monaco |
| 9,195,753 B1 | 11/2015 | King et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 9,501,561 B2 | 11/2016 | Rubin et al. |
| 9,514,466 B2 | 12/2016 | Jacobson et al. |
| 9,584,343 B2 | 2/2017 | Brezina et al. |
| 2001/0022792 A1 | 9/2001 | Maeno et al. |
| 2001/0037407 A1 | 11/2001 | Dragulev et al. |
| 2001/0049628 A1 | 12/2001 | Icho |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0093483 A1 | 5/2003 | Allen et al. |
| 2003/0114171 A1 | 6/2003 | Miyamoto |
| 2003/0114956 A1 | 6/2003 | Cullen et al. |
| 2003/0120608 A1 | 6/2003 | Pereyra |
| 2003/0131062 A1 | 7/2003 | Miyashita |
| 2003/0142125 A1 | 7/2003 | Salmimaa et al. |
| 2003/0167324 A1 | 9/2003 | Farnham et al. |
| 2003/0200190 A1* | 10/2003 | Adar ............... G06Q 10/10 706/45 |
| 2003/0204439 A1 | 10/2003 | Cullen, III |
| 2003/0220835 A1 | 11/2003 | Barnes, Jr. |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0122904 A1 | 6/2004 | Kim |
| 2004/0128355 A1 | 7/2004 | Chao et al. |
| 2004/0128356 A1 | 7/2004 | Bernstein et al. |
| 2004/0133561 A1 | 7/2004 | Burke |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0215734 A1 | 10/2004 | Nagai et al. |
| 2004/0260756 A1 | 12/2004 | Forstall et al. |
| 2004/0268229 A1 | 12/2004 | Paoli et al. |
| 2005/0015432 A1 | 1/2005 | Cohen |
| 2005/0027779 A1 | 2/2005 | Schinner |
| 2005/0038687 A1 | 2/2005 | Galdes |
| 2005/0044152 A1 | 2/2005 | Hardy et al. |
| 2005/0049896 A1 | 3/2005 | Giunta |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0076221 A1 | 4/2005 | Olkin et al. |
| 2005/0080868 A1 | 4/2005 | Malik |
| 2005/0091272 A1 | 4/2005 | Smith et al. |
| 2005/0091314 A1 | 4/2005 | Blagsvedt et al. |
| 2005/0091401 A1 | 4/2005 | Keohane et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0140653 A1 | 6/2005 | Pletikosa et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0188028 A1 | 8/2005 | Brown, Jr. et al. |
| 2005/0198159 A1 | 9/2005 | Kirsch |
| 2005/0198299 A1 | 9/2005 | Beck et al. |
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0210111 A1 | 9/2005 | Fukudome |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0223315 A1 | 10/2005 | Shimizu et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt et al. |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0041508 A1 | 2/2006 | Pham et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101334 A1 | 5/2006 | Liao et al. |
| 2006/0101350 A1 | 5/2006 | Scott |
| 2006/0123357 A1 | 6/2006 | Okamura |
| 2006/0129844 A1 | 6/2006 | Oshikiri |

(56) References Cited

U.S. PATENT DOCUMENTS

| | | |
|---|---|---|
| 2006/0136494 A1 | 6/2006 | Oh |
| 2006/0168059 A1 | 7/2006 | Chang et al. |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0224938 A1 | 10/2006 | Fikes et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0265460 A1* | 11/2006 | Kiyohara ............ G06Q 10/107 709/206 |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050711 A1 | 3/2007 | Walker et al. |
| 2007/0060328 A1 | 3/2007 | Zrike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118528 A1 | 5/2007 | Choi et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1 | 7/2007 | Armstrong et al. |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0192699 A1 | 8/2007 | Lee et al. |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig et al. |
| 2007/0218900 A1 | 9/2007 | Abhyanker |
| 2007/0244881 A1 | 10/2007 | Cha et al. |
| 2007/0250585 A1 | 10/2007 | Ly et al. |
| 2007/0255794 A1 | 11/2007 | Coutts |
| 2007/0266001 A1 | 11/2007 | Williams et al. |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294428 A1 | 12/2007 | Guy et al. |
| 2008/0005247 A9 | 1/2008 | Khoo |
| 2008/0005249 A1 | 1/2008 | Hart |
| 2008/0031241 A1 | 2/2008 | Toebes et al. |
| 2008/0037721 A1 | 2/2008 | Yao et al. |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0055263 A1 | 3/2008 | Lemay et al. |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1* | 3/2008 | Roy ................ G06F 17/30702 |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0154751 A1 | 6/2008 | Miles |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0235681 A1 | 9/2008 | Barnett |
| 2008/0242277 A1 | 10/2008 | Chen et al. |
| 2008/0243841 A1 | 10/2008 | Bonnet et al. |
| 2008/0244070 A1 | 10/2008 | Kita et al. |
| 2008/0261569 A1 | 10/2008 | Britt et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307046 A1 | 12/2008 | Baek et al. |
| 2008/0307066 A1 | 12/2008 | Amidon et al. |
| 2008/0319943 A1 | 12/2008 | Fischer |
| 2008/0320417 A1 | 12/2008 | Begley et al. |
| 2009/0005076 A1 | 1/2009 | Forstall et al. |
| 2009/0006366 A1* | 1/2009 | Johnson ............ G06F 17/30707 |
| 2009/0010353 A1 | 1/2009 | She et al. |
| 2009/0012806 A1 | 1/2009 | Ricordi et al. |
| 2009/0029674 A1 | 1/2009 | Brezina et al. |
| 2009/0030773 A1* | 1/2009 | Kamhoot ................ G06Q 30/00 705/7.32 |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo et al. |
| 2009/0076795 A1* | 3/2009 | Bangalore ............ G06F 17/2785 704/9 |
| 2009/0077026 A1 | 3/2009 | Yanagihara |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0112678 A1 | 4/2009 | Luzardo |
| 2009/0119678 A1 | 5/2009 | Shih et al. |
| 2009/0132949 A1 | 5/2009 | Bosarge |
| 2009/0156170 A1 | 6/2009 | Rossano et al. |
| 2009/0157717 A1 | 6/2009 | Palahnuk et al. |

(56) References Cited

U.S. PATENT DOCUMENTS

| | | |
|---|---|---|
| 2009/0164902 A1 | 6/2009 | Cohen et al. |
| 2009/0171930 A1 | 7/2009 | Vaughan et al. |
| 2009/0171979 A1 | 7/2009 | Lubarski et al. |
| 2009/0174680 A1 | 7/2009 | Anzures et al. |
| 2009/0177754 A1 | 7/2009 | Brezina et al. |
| 2009/0182552 A1 | 7/2009 | Fyke et al. |
| 2009/0182788 A1 | 7/2009 | Chung et al. |
| 2009/0191899 A1 | 7/2009 | Wilson et al. |
| 2009/0198688 A1 | 8/2009 | Venkataraman et al. |
| 2009/0204903 A1 | 8/2009 | Edelen et al. |
| 2009/0209286 A1 | 8/2009 | Bentley et al. |
| 2009/0213088 A1 | 8/2009 | Hardy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0240669 A1 | 9/2009 | Ando et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0276713 A1 | 11/2009 | Eddy |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0327849 A1 | 12/2009 | Kavanagh et al. |
| 2009/0328161 A1 | 12/2009 | Puthenkulam et al. |
| 2010/0009332 A1 | 1/2010 | Yaskin et al. |
| 2010/0030715 A1 | 2/2010 | Eustice et al. |
| 2010/0036833 A1 | 2/2010 | Yeung et al. |
| 2010/0049534 A1 | 2/2010 | Whitnah et al. |
| 2010/0057858 A1 | 3/2010 | Shen et al. |
| 2010/0057859 A1 | 3/2010 | Shen et al. |
| 2010/0060595 A1 | 3/2010 | Lee et al. |
| 2010/0062753 A1 | 3/2010 | Wen et al. |
| 2010/0070875 A1 | 3/2010 | Turski et al. |
| 2010/0073284 A1 | 3/2010 | Dods et al. |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay et al. |
| 2010/0167700 A1 | 7/2010 | Brock et al. |
| 2010/0169327 A1 | 7/2010 | Lindsay et al. |
| 2010/0174784 A1 | 7/2010 | Levey et al. |
| 2010/0185610 A1 | 7/2010 | Lunt et al. |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229223 A1 | 9/2010 | Shepard et al. |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0273456 A1 | 10/2010 | Wolovitz et al. |
| 2010/0281535 A1 | 11/2010 | Perry, Jr. et al. |
| 2010/0306185 A1 | 12/2010 | Smith et al. |
| 2010/0312837 A1 | 12/2010 | Bodapati et al. |
| 2010/0318614 A1 | 12/2010 | Sager et al. |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1 | 3/2011 | Rashad et al. |
| 2011/0086627 A1 | 4/2011 | Khosravi |
| 2011/0087969 A1 | 4/2011 | Hein et al. |
| 2011/0119593 A1 | 5/2011 | Jacobson et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0196802 A1 | 8/2011 | Ellis et al. |
| 2011/0201275 A1 | 8/2011 | Jabara et al. |
| 2011/0219317 A1 | 9/2011 | Thatcher et al. |
| 2011/0225293 A1 | 9/2011 | Rathod |
| 2011/0231407 A1 | 9/2011 | Gupta et al. |
| 2011/0235790 A1 | 9/2011 | Strope et al. |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0298701 A1 | 12/2011 | Holzer et al. |
| 2012/0011204 A1 | 1/2012 | Morin et al. |
| 2012/0017158 A1 | 1/2012 | Maguire et al. |
| 2012/0023416 A1 | 1/2012 | Khoo |
| 2012/0036254 A1 | 2/2012 | Onuma |
| 2012/0041907 A1 | 2/2012 | Wang et al. |
| 2012/0054681 A1 | 3/2012 | Cort et al. |
| 2012/0060102 A1 | 3/2012 | Shohfi et al. |
| 2012/0079023 A1 | 3/2012 | Tejada-Gamero et al. |
| 2012/0084461 A1 | 4/2012 | Athias et al. |
| 2012/0089678 A1 | 4/2012 | Cort et al. |
| 2012/0089690 A1 | 4/2012 | Hein et al. |
| 2012/0110080 A1 | 5/2012 | Panyam et al. |
| 2012/0110096 A1 | 5/2012 | Smarr et al. |
| 2012/0150970 A1 | 6/2012 | Peterson et al. |
| 2012/0150978 A1 | 6/2012 | Monaco et al. |
| 2012/0150979 A1 | 6/2012 | Monaco |
| 2012/0166999 A1 | 6/2012 | Thatcher et al. |
| 2012/0197871 A1 | 8/2012 | Mandel et al. |
| 2012/0198348 A1 | 8/2012 | Park |
| 2012/0204089 A1 | 8/2012 | Boudreau et al. |
| 2012/0246065 A1 | 9/2012 | Yarvis et al. |
| 2012/0259834 A1 | 10/2012 | Broder et al. |
| 2012/0271822 A1 | 10/2012 | Schwendimann et al. |
| 2012/0278428 A1 | 11/2012 | Harrison et al. |
| 2012/0310977 A1 | 12/2012 | Bush et al. |
| 2012/0330658 A1 | 12/2012 | Bonforte |
| 2012/0330980 A1 | 12/2012 | Rubin et al. |
| 2012/0331418 A1 | 12/2012 | Bonforte |
| 2013/0007627 A1 | 1/2013 | Monaco |
| 2013/0014021 A1 | 1/2013 | Bau et al. |
| 2013/0053074 A1 | 2/2013 | Sanchez et al. |
| 2013/0080915 A1 | 3/2013 | Lewis et al. |
| 2013/0091288 A1 | 4/2013 | Shalunov et al. |
| 2013/0173712 A1 | 7/2013 | Monjas Llorente et al. |
| 2013/0246931 A1 | 9/2013 | Harris et al. |
| 2013/0260795 A1 | 10/2013 | Papakipos et al. |
| 2014/0011481 A1 | 1/2014 | Kho |
| 2014/0081914 A1 | 3/2014 | Smith et al. |
| 2014/0081964 A1 | 3/2014 | Rubin et al. |
| 2014/0087687 A1 | 3/2014 | Brezina et al. |
| 2014/0089304 A1 | 3/2014 | Rubin et al. |
| 2014/0089411 A1 | 3/2014 | Rubin et al. |
| 2014/0095433 A1 | 4/2014 | Cort et al. |
| 2014/0100861 A1 | 4/2014 | Ledet |
| 2014/0115086 A1 | 4/2014 | Chebiyyam |
| 2014/0156650 A1 | 6/2014 | Jacobson |
| 2014/0207761 A1 | 7/2014 | Brezina et al. |
| 2014/0214981 A1 | 7/2014 | Mallet et al. |
| 2014/0215626 A1 | 7/2014 | Pam et al. |
| 2014/0280097 A1 | 9/2014 | Lee et al. |
| 2014/0287786 A1 | 9/2014 | Bayraktar et al. |
| 2015/0074213 A1 | 3/2015 | Monaco |
| 2015/0170650 A1 | 6/2015 | Bonforte |

(56) References Cited

U.S. PATENT DOCUMENTS

| | | | |
|---|---|---|---|
| 2015/0222719 | A1 | 8/2015 | Hein et al. |
| 2016/0070787 | A1 | 3/2016 | Brezina et al. |
| 2016/0182661 | A1 | 6/2016 | Brezina et al. |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

"OpenSocial Specification v0.9", OpenSocial and Gadgets Specification Group, Apr. 2009.
"The Ultimate Guide for Everything Twitter", Webdesigner Depot, archive.org webpage https://web.archive.org/web/20090325042115/http://www.webdesignerdepot.com/2009/03/the-ultimate-guide-for-everything-twitter/ from Mar. 25, 2009.
Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).
Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.
Carvalho, Vitor R. et al., "Ranking Users for Intelligent Message Addressing," Proceedings of the 30th European conference on Information Retrieval, Glasgow, England, Mar. 30-Apr. 3, 2008, pp. 321-333.
Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).
Elsayed, Tamer et al., "Personal Name Resolution in Email: A Heuristic Approach," University of Maryland Technical Report No. TR-LAMP-150, Mar. 17, 2008.
Epstein, "Harnessing User Data to Improve Facebook Features", Doctoral dissertation, Boston College, May 12, 2010.
European Patent Application No. 11849271.9, Extended Search Report, dated Apr. 3, 2014.
European Patent Application No. 12801970.0, Extended Search Report, dated Oct. 23, 2014.
European Patent Application 12801998.1, Extended Search Report, dated Feb. 10, 2015.
Extended European Search Report, EP 10 78 3783, dated Mar. 24, 2014.
Fitzpatrick, Brad, "AddressBooker," Github Social Coding, located at http://addressbooker.appspot.com/, Nov. 28, 2008 (document provided includes third-party comments submitted under the USPTO PeerToPatent program).
Google Inc. "OpenSocial Tutorial," located at http://code.google.com/apis/opensocial/articles/tutorial/tutorial-0.8.html, Aug. 2008.
Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).
Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).
Hannon et al., "Recommending Twitter Users to Follow Using Content and Collaborative Filtering Approaches", RecSys2010, Sep. 26-30, 2010, Barcelona, Spain.
International Patent Application PCT/US10/34782, International Search Report and Written Opinion, dated Dec. 22, 2010.
International Patent Application PCT/US10/35405, International Search Report and Written Opinion, dated Jan. 3, 2011.
International Patent Application PCT/US10/52081, International Search Report and Written Opinion, dated May 20, 2011.
International Patent Application PCT/US10/56560, International Search Report and Written Opinion, dated Jun. 21, 2011.
International Patent Application PCT/US11/64958, International Search Report and Written Opinion, dated Jul. 31, 2012.
International Patent Application PCT/US12/043523, International Search Report and Written Opinion, dated Nov. 28, 2012.
International Patent Application PCT/US2011/064892, International Search Report and Written Opinion, dated Aug. 22, 2012.
International Patent Application PCT/US2012/043507, International Search Report and Written Opinion, dated Jan. 3, 2013.
Microsoft Corporation, "About AutoComplete Name Suggesting," Microsoft Outlook 2003 help forum, located at http://office.microsoft.com/en-us/outlook/HP063766471033.aspx, 2003.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.

\* cited by examiner

PRESENTATION OF ORGANIZED PERSONAL AND PUBLIC DATA USING COMMUNICATION MEDIUMS

CROSS-REFERENCE TO RELATED APPLICATIONS

This application is a divisional of and claims the benefit of U.S. Pat. No. 9,584,343, issued Feb. 28, 2017, which itself claims the benefit of and priority to U.S. Provisional Application Ser. No. 61/018,883 titled "PRESENTATION OF ORGANIZED PERSONAL AND PUBLIC DATA USING COMMUNICATION MEDIUMS," filed on Jan. 3, 2008, the disclosures of which are incorporated herein by reference in their entirety.

TECHNICAL FIELD

The subject matter of this application is generally related to electronic messaging (e.g., "email").

BACKGROUND

Electronic messaging systems can be used to transmit information between users. Content can include the body of a message along with one or more attachments. Conventional messaging systems provide few organizational tools for presenting information associated with an attachment. For example, a conventional messaging system such as Yahoo® mail can be used to display attachments without the need to open or display the underlying message in which the attachment was received.

SUMMARY

In some implementations, email may be organized and navigated by attachments. In these implementations, email may be navigated and organized by chronological list of emails. An attachment may be selected and metadata associated with the attachment may be displayed including, but are not limited to, related attachments, related people, related conversations, revision history and the like.

In some implementations, attachment profile may be displayed based off implicit user actions such as, for example, viewing an email that contains an attachment or opening an attachment. When an email containing an attachment is opened or an attachment is opened through a native application, an attachment profile may be automatically displayed which may provide context to the attachment.

In some implementations, an attachment to an email message may be identified. Metadata associated with the attachment also may be identified that may include information selected from a group comprising related attachments, related people, related conversations or revision histories. The attachment and the metadata may be stored in an searchable database.

In some implementations, content on a web page that is linked to or from within an email may be identified. In some implementations, the content in a searchable database may be aggregated. In some implementations, an action of a user that relates to the content in the searchable database may be identified. In some implementations, the related content may be retrieved and the retrieved content may be presented to the user.

In some implementations, a time period in which one or more messages are to be monitored may be identified. One or more user actions of a user associated with the one or more messages may be monitored. Training data based on the one or more monitored user actions may be developed. One or more subsequent messages may be presented to the user based on the training data.

In some implementations, a computer-readable medium may be provided. The computer-readable medium may include instructions stored thereon, which, when executed by a processor, causes the processor to perform operations comprising: displaying a sidebar tool to facilitate a selection of an message attachment information view and a personal profile information view; displaying content associated with one or more message attachments when the message attachment information is selected; and displaying personal or public data of one or more users associated with the one or more message attachments when the personal profile information view is selected.

In some implementations, attachment profiles may be displayed alongside emails, such as in implementations which utilize sidebar, or alongside attachment content in various applications such as, for example, Microsoft® Word, Adobe Acrobat®, in a web browser such as Firefox® and the like.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
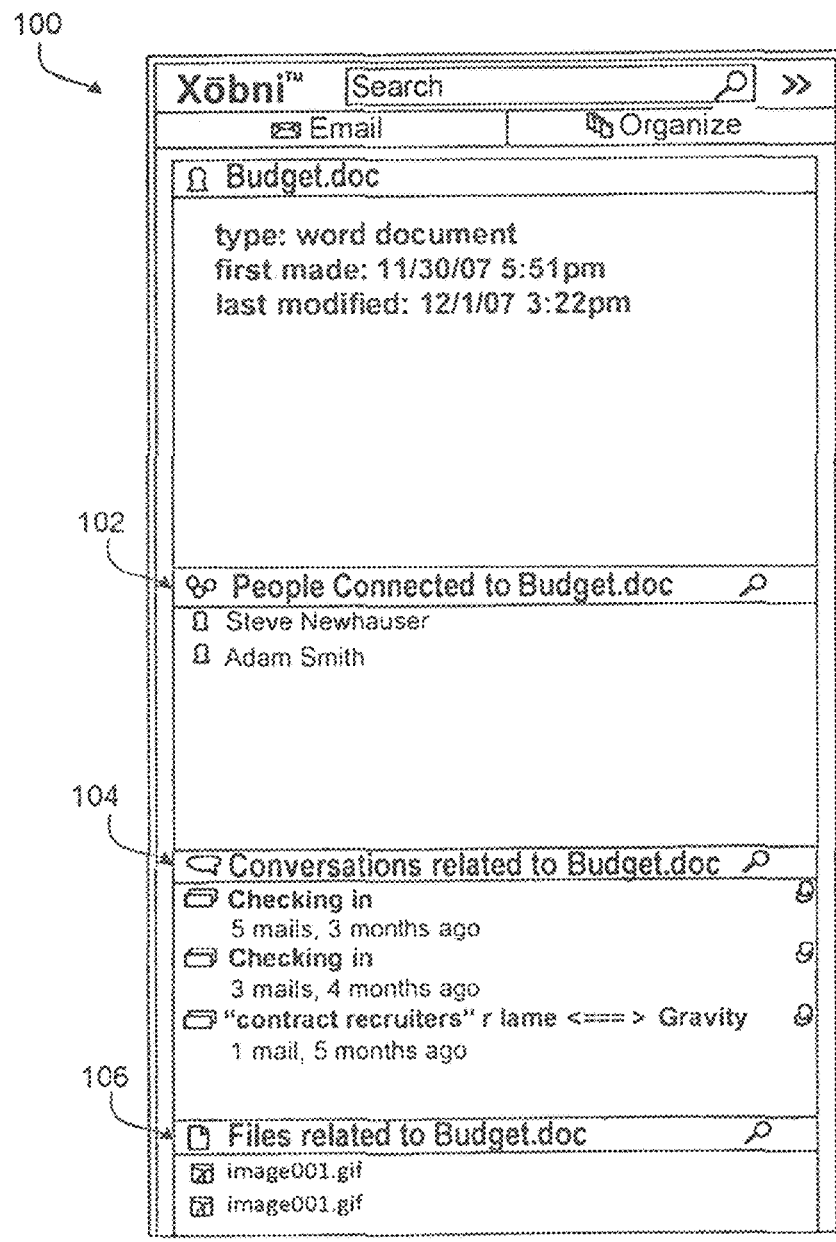
FIG. 1 shows an example attachment view of people, messaging conversations, and email attachments.

As used herein, the term "participant" refers to a user of the described system. As used herein, the term "subject" refers to the sender, receiver, creator, or subject of a communication medium. As used herein, the term "information viewer" includes any method to display personal and public data.

Email Attachment Management

The following sections describe ways to manage, search, and browse attachments and integrate such information with external communication systems as well as methods for collaborating on the development of attachment materials.

The Email Attachment Entity or Object

In some implementations, the participant may view comprehensive profile and content information concerning an email attachment using an attachment information viewer or other viewers capable of receiving and presenting such information to the participant. The participant may view the email attachment information and the person profile information on a same computing system or platform. The participant may switch between the person profile view and the email attachment information view if desired. In some implementations, the participant may utilize a sidebar tool which allows the participant to switch between the email attachment information and the person profile view within the sidebar tool.

In some implementations, the participant may execute the email attachment information view using one of the following example techniques. One of ordinary skill would appreciate that other techniques also may be used. Such techniques include, but are not limited to: (1) selecting an email attachment that is associated with a subject's person profile, and launching using an email attachment information viewer; (2) hovering over the file attached to an email in the email viewer, and launching using an email attachment information viewer; (3) executing a search query from within the system's search mechanism for attachments, selecting an attachment from the search results and launching using an email attachment information viewer through the selected attachment; (4) executing a search query from within a third party system such as, for example, a desktop search system, an online search system, a web-based email application, an enterprise search system, an enterprise document management system, an online document management system, an enterprise resource planning system, a customer relationship management system, a social networking system or other systems with search mechanisms capable of leveraging the email attachment search mechanism through an integration mechanism such as, but is not limited to, Application Programming interfaces (API's) or Web Services provided by this system; selecting an email attachment from the search results; and launching using an email attachment information viewer or other viewers; (5) browsing a categorized list of all email attachments residing on a participant's email client or email server; selecting an email attachment from the search results; and launching using an email attachment information viewer or other viewers; and (6) browsing a categorized list of files (including email attachments) returned by a third party system such as, for example, a desktop browse system, or an enterprise data browse system, an enterprise document management system, an online document management system, an enterprise resource planning system, a customer relationship management system, a social networking system, other systems with browse mechanisms capable of leveraging an email attachment browse mechanism through an integration mechanism such as, but is not limited to, Application Programming interfaces (API's) or Web Services provided by this system; selecting the document from the browse results; and launching using an email attachment information viewer or other viewers. In other implementations, the participant may search and browse email attachments, persons (i.e. subjects) and the like on the same system. One such implementation of the system is the sidebar implementation.

Email Attachment Summary Information

In some implementations, using the email attachment information viewer (or other viewers that may receive and present the same information), the participant may, but is not limited to: (1) view a thumbnail that represents the content of an attachment where a content viewer may be launched to preview the content (as will be discussed further below under the section "Email Attachment Content Viewer"); (2) explore when an attachment was first sent or received; (3) determine from whom or to whom an attachment was first received or sent to; (4) view a list of emails containing an attachment; (5) view when an attachment was last viewed and opened by a participant; (5) view the mime type of an attachment (e.g., PDF, JPEG, Word document, MP3, WAV, etc.); (6) view the size of an attachment; (7) view a thumbnail of an attachment; (8) view the name of the author of an attachment; (9) view a textual description of an attachment; (10) view whether the attachment has been scanned for known computer viruses; (11) view other pertinent information unique to an attachment's mime type; and (12) view information about the local repository, network repository or online repository from which an attachment was sent or created.

In some implementations, a participant may view summary information related to an email attachment by, without limitation: (1) hovering over an email attachment in an email client's email content viewer to allow a window to be populated for displaying summary information associated with the email attachment; (2) hovering over an email attachment in the person profile viewer to allow a window to be populated for displaying summary information associated with the email attachment; (3) hovering over an email attachment in the search results set returned by the system's search mechanism to allow a window to be populated for displaying summary information associated with the email attachment; (4) hovering over an email attachment in the search results set returned by a third party system such as, without limitation, a desktop search system, an online search system, an enterprise search system, an enterprise document management system, an online document management system, an enterprise resource planning system, a customer relationship management system, a social networking system or other systems with search mechanisms to allow a window to be populated for displaying summary information associated with the email attachment; and (5) hovering over an email attachment in the browse results set returned by the system or a third party system such as, without limitation, a desktop browse system, an enterprise data browse system, an enterprise document management system, an online document management system, an enterprise resource planning system, a customer relationship management system, a social networking system, or other systems with search mechanisms to allow a window to be populated for displaying summary information associated with the email attachment.

Email Attachment Relationships and Associations

In some implementations, when a participant receives an email attachment, the participant may view which subject or person sent it, and which other subject(s) or persons received the same email attachment. In these implementations, the system also may indicate to the participant whether the sending and receiving subjects or persons are internal or external to the participant's group or organization. The participant may click on a subject or person to switch to a person profile view. In the person profile view, the participant may view an email conversation (or email thread) that has taken place that is related to the email attachment. Additionally, the participant may click a "Print" action mechanism to command the system to consolidate and print emails or threads related to the conversation.

In other implementations, a participant may click a "Forward Conversation" action mechanism to command the system to consolidate emails or threads (e.g., including attachments) related to the conversation into a single email, and forward the consolidated emails or threads to other subjects or persons.

Yet in other implementations, a participant may view a list of other email attachments that are related to an email attachment. In these implementations, an attachment-to-attachment relationship may be established explicitly by the participant or implicitly by the system based on, without limitation, the following qualifiers or relationship types: (1) manually designating that two or more email attachments are related; (2) email attachments that are part of an email conversation or thread; (3) email attachments having similar content; (4) email attachments that were attached to the same email; (5) email attachments that have the same content author; and (6) email attachments that were sent by the same subject.

A participant also may view a list of files containing similar content residing on the Internet such as, without limitation, web pages, web sites, Wikipedia®, online blogs, online document management systems, social networking systems, online video streaming and repository systems, online image repositories, e-commerce sites, governmental agencies (e.g., Library of Congress) and the like. The participant also may view a to-do list of items, instant messaging conversations, calendar events, phone call logs, web conferencing transcripts and recordings related to an attachment. FIG. 1 shows an example attachment view 100 of people 102, messaging conversations 104, and email attachments 106.

Email Attachment Search and Browse

In some implementations, a participant may search for email attachments using the system's search mechanism. The system's search mechanism may return one or more persons (or subjects), emails, web search results, and email attachment matches to the participant. The participant may enter one or more search keywords or phrases into the system, and the system may perform a search based on the input queries for email attachments containing matching metadata (e.g., subject, sender, title, etc), content, summary information and the like. The participant may optionally restrict a search for email attachments by specifying, without limitation: (1) a date range in which an email attachment was received or sent; (2) a subject or person who sent or received the attachment; (3) an attachment mime type or file name extension; and (4) a voting status (as will be discussed in greater detail below in "Email Attachment Collaboration").

A participant may browse for email attachments that have been categorized by the following dimensions, such as, without limitation, the subject(s) who sent it or who received it (additional qualification may include the subject(s) listed as high-priority or very important), the external organization (i.e. partner or customer organization) that originated it (additional qualification may include the organization(s) listed as high-priority or very important), user generated tags used to describe the attachment, the department or sub-organization that originated the attachment for attachments originated from internal groups (additional qualification may include the department(s) listed as high-priority or very important), attachment mime type, date range (e.g. received less than 2 days ago, less than 1 week ago, less than 1 month ago, etc.), attachment size, voting status and number of recipients.

Email Attachment Content Viewer

A participant may view a thumbnail of the attachment on the email attachment information view. The thumbnails may be displayed for the following file types including, without limitation, a thumbnail image of the first page of a textual attachment (e.g. Word, TXT, HTML, XML etc), a thumbnail image of an image attachment (e.g. JPEG, GIF, TIF etc), a thumbnail image of the first page of a Power point attachment, a thumbnail image of an icon to represent an audio file (e.g. RAM, WAV, MP3 etc) which the system can show a different icon for each different audio file type, and a thumbnail image of a frame from the video file (e.g. AVI, FLV, GVI, WMV, MOV, etc.).

In some implementations, when the participant hover over a thumbnail in the email attachment information view, a window is populated with an enlarged view of the thumbnail. In these implementations, a sample of the content may be automatically displayed on the enlarged pop-up. For example, an abbreviated "slideshow" of different pages of the textual attachment may be presented. As another example, an image may be rendered at its original size and aspect ratio. As yet another example, an abbreviated "slideshow" of different pages of the power point attachment may be presented. As yet another example, a snippet from an audio file may be played. As yet another example, a short segment of a video file can be played. One of ordinary skill in the art would understand that other implementations in addition to those discussed above also are contemplated.

In some implementations, the participant may hit a "Play" or "View" action mechanism which may launch a content viewer. In this viewer, the participant may page through a slideshow view of a textual attachment (or set the slideshow to run automatically), or view an image attachment in its original size and aspect ratio. Additionally, the participant may zoom in and out of a specific portion(s) of an image, page through a slideshow view of a power point attachment (or set the slideshow to run automatically), listen to an audio file or watch a video which may allow the participant to go to a specific segment of the audio or video file for immediate playback.

Email Attachment Comparison

In some implementations, the participant may select two or more email attachments and perform a document comparison on the system (without having to download the attachments and to open a separate document comparison application). In these implementations, the system may integrate with document comparison applications to provide document comparison capabilities natively in the system.

Email Attachment Collaboration

In some implementations, the participant may view an email conversation (or email thread) that has taken place that is related to an email attachment. The participant may click a "Print" action mechanism and the system may consolidate and print the emails or threads in the conversation. The participant also may click a "Forward Conversation" action mechanism and the system may consolidate the emails or threads related to a conversation into a single email, and forward the consolidated emails or threads containing the emails and attachments to other subjects or persons. The participant also may view an email conversation related to a document residing in other document collaboration systems. This may be achieved through a data integration between the system and these other document collaboration systems.

In some implementations, the participant may view an email attachment's collaboration history in this system's email attachment's information view. This attachment collaboration history may be captured by this system. The system may piece together the collaboration history of an attachment based on, for example, an analysis of the attachment's metadata, content changes, tracking of the copies of the attachment that was sent out to other subjects, and comparison of the attachment's content with similar documents residing in other repositories. This collaboration history may include, but is not limited to, change tracking (e.g., who made the revisions and when were the revisions made), document comparison (e.g., what change(s) were made relative to an earlier version), and document trail (e.g., whether there is a first version, an immediate version or final version of a document). The participant generally may view a visual representation of this document trail.

In some implementations, the participant may view an email attachment collaboration history in the system that was captured by other document collaboration systems. This may be achieved through a data and security integration between the system and these other document collaboration systems.

In some implementations, the participant may view who has received this attachment and which other subjects or persons have access to one or more files (e.g., as defined in document collaboration, content management system, and other collaboration and file repository systems) but who may not have received the file(s) over email. This may be achieved through a data and security integration between the system and these other systems.

In some implementations, the participant sending out an email attachment may request a vote or rating from one or more receiving subjects about the email attachment. The vote or rating may include, without limitation, "Accept" a document, "Reject" a document, "Highly Recommend it", "Hate it", "Lukewarm about it".

In some implementations, the participant and subjects or persons may comment on an email attachment. These comments may become visible to all subjects or persons who received the attachment. These subjects may view the comments together with, for example, the comment's date, author, parent and child relationships (e.g. a comment, "the child" may be in response to another comment, "the parent"). Alternatively, the participant or subject who created the comment(s) may choose to only display the comments to subjects internal or external to the organization, or only to specific/named subjects or persons. Comments also may be visible in other document collaboration, content management, file repository, and collaboration systems. In an event that the recipients receiving such an attachment containing comments and/or shared notes do not use this system, the comments may be appended to the email containing the email attachment so that such recipients may still view the comments and/or shared notes.

Email Attachment Distribution and Synchronization

In some implementations, the system may automatically distribute and synchronize email attachments to enterprise applications, enterprise systems and content management systems such as, without limitation, Enterprise content management systems, Desktop content management systems, Enterprise file server or repository systems, Enterprise application systems (e.g., deployed on-premise or hosted by a third party provider) such as, for example, Customer Relationship Management systems, Digital Asset Management systems, Enterprise Resource Planning systems, Product Data Management systems, Product Lifecycle Management systems, Supply Chain Management systems, Product Information Management systems, Marketing Automation systems, Product Management and Product Planning systems, and Project Management (PM) systems and the like, Online document repository, document sharing, collaboration sites, and Peer-to-peer and online document collaboration systems.

Integration to Web Conferencing Systems

In some implementations, the participant may launch a web conferencing session directly from the system and the system may automatically upload the selected email attachment(s) onto the web conferencing session. In these implementations, web conference session related message board messages, voting results, notes, visual transcripts, audio transcripts and other related conference generated artifacts supported by the web conference system may be automatically uploaded or downloaded and associated with an email attachment. After a web conference, attendees may receive an email containing one or more file(s) that was (were) discussed, and the associated conference information (e.g., as described in the previous bullet) also may be received and presented appropriately (e.g., properly associated with the email attachment) to the subject by the system.

In some implementations, if the conference leader launches the session directly from the web conference system and uploads the document(s) from a desktop or other document repository system, the conference leader and the attendees may still receive an email containing the document(s) and the associated conference information as described previously after the conference session has ended. This information may be presented appropriately (e.g., properly associated with the email attachment) to the subject by the system.

Collaborative Email Content Creation

In some implementations, the participant may create an email and save it as a draft document that may be circulated around to multiple subjects to be worked on as a work-in-process document. This supports collaborative email content creation.

In some implementations, the system may provide a locking mechanism which requires a subject or the participant to "check out and lock" the document while he or she is editing the document. In these implementations, others trying to access this document may view the document but may not edit the document until the subject or participant checks the document back in and releases the lock.

In some implementations, the participant and subject(s) may add comments or shared notes to the draft email for others to view.

In some implementations, the system may allow the participant and subject(s) to indicate that he or she is done either reviewing the document or have no more edits to make to the document. This can help the participant to know when the draft document is "completed" and is ready to be sent out to the appropriate subjects.

In some implementations, the subjects that receive the completed/final email may view the list of people who were involved in creating the content in the email.

In some implementations, when the draft email is still in the work-in-process state, the participant and subject(s) may invite others to take part in the creation of the content.

In some implementations, the system may indicate which subjects are internal or external to the organization.

In some implementations, the system may provide the ability to the participant to define different levels/types of access to the different subjects involved in the collaboration.

In some implementations, once an email has been completed, in addition to sending the email out to designated recipients, the participant may also publish the contents of the email to, without limitation, external websites, intranet sites, Wikipedia® sites, online blog sites, content management systems, online document repositories, online document sharing and collaboration sites, and peer-to-peer and online document collaboration systems.

Document Management for Task Management

In some implementations, the participant may synchronize email attachments to project management or task management systems. The participant also may associate an email attachment to a participant created task in the system. The system may automatically associate received email attachments to tasks based on, without limitation, file metadata including, for example, file naming conventions (e.g. all documents with "_ProductLaunch2008" as part of its filename are associated to a 2008 Product Launch Task), file descriptions, file keywords, and file mime type, subject(s) who sent the attachment (e.g. all email attachments received from Vendor ABC is related to the Product Sourcing Task), and email content and machine training/learning (e.g., over time the system learns that the existence of certain keywords in an email delivering the document attachment results in the attachment being associated with certain task(s)). In these implementations, the participant may search and browse for all email attachments related to one or more tasks.

Integration to Other Systems

In some implementations, other systems may send and receive data, conduct transactions, synchronize security access and documents related to email attachments with this system through a set of published Application Programming Interfaces (API's) and Web Services. These other systems may include, but are not limited to, enterprise content management systems, desktop content management systems, enterprise file server systems, enterprise application systems (deployed on-premise or hosted by a third party provider) such as customer relationship management systems, digital asset management systems, enterprise resource planning systems, product data management systems, product lifecycle management systems, supply chain management systems, product information management systems, marketing automation systems, product management and product planning systems, and project management (PM) systems, online document repository, document sharing and collaboration sites, peer-to-peer document collaboration systems, enterprise and online search systems, enterprise and online content tagging systems, enterprise and online content recommendation systems, and email analytical and forensic systems.

Searching Content Behind Hyperlinks Sent and Received

In some implementations, content existing on the web which is linked to from within an email or other communication medium may be aggregated and treated as a personal knowledge base. In these implementations, content from these web pages may be searched by the participant or be displayed to the participant based on implicit user actions such as looking at an email sent by someone who has sent the participant hyperlinks in past communications.

In some implementations, when a participant searches a personal knowledge base (based on content behind hyperlinks), the system may also display results which exist outside of the personal knowledge base but may be accessible through a standard web search engine.

In some implementations, when a participant searches the web using a standard web search engine, the system may use the same keywords to automatically provide search results from the personal hyperlinked knowledge base.

In some implementations, since the content behind hyperlinks is constantly changing, the system may distinguish between the content that existed on the hyperlinked webpage when the hyperlink was initially sent or received as well as what exists on the hyperlinked webpage at the current time.

In some implementations, when searching the personal knowledge base, the content that is being searched may include, for example, the body of the message a hyperlink was sent with, and the result may display both the matching body text as well as the content behind the attending hyperlink.

In general, hyperlink referenced website content may be presented through search or implicit user actions. The content of the information is discovered and created by analyzing all the hyperlinks sent or received via email, IM, or other electronic medium. The content (web pages) on the web referenced by these hyperlinks is crawled by the system and stored. Alternative to crawling the content itself, the system may fetch information about the content of the pages from a remote provider serving content. This may be useful for speeding up crawling, minimizing the number of outbound connections. Also, the content may already be preprocessed or compressed by the provider to save local processing time or transmission time and storage space.

In some implementations, stored with the content of the web pages may include the metadata associated with the source of the hyperlink including, without limitation, the body text of the email, subject, sender, recipient, email date, carbon-copied recipients, attachments and the like. This information may be presented alongside search results matching words in email bodies, results matching people's names, or content matching keywords on the web.

In one implementation, the system may include some or all of the following features: the system may present relevant hyperlinked web data with content matching keywords that are typed in a search box; the system may present relevant hyperlinked web data with content matching keywords ranked using techniques such as term frequency, or TF-IDF (Term frequency inverse document frequency) where additional relevant results may be obtained by using a thesaurus or employing techniques such as LSI (latent semantic indexing) and presented automatically when viewing a body of text; the results of keyword searches in the hyperlinked web page content database may be presented alongside search results for the greater web; advertisements may be placed in, next to, or near hyperlinked web page search results based on the keywords used to search the hyperlinked web page content; and metadata associated with a hyperlinked web data result may be presented as part of the search result. This data may include, for example, the name of the person who sent the hyperlink referencing this data, the person who received it, when it was sent, how it was sent, who else received it, etc.

Hyperlink Process

In some implementations, the system may find some or all of the hyperlinks in a corpus of communication text including, for example, email, instant messaging and online chat.

In some implementations, the hyperlinks may be followed by the system to extract the content existing on the web.

In some implementations, the content from the web may be crawled and the textual information may be indexed. In these implementations, the web may be crawled in real time as the content behind hyperlinks may be dynamic and may change since last indexing. Alternatively, the web may be crawled synchronously at a predefined interval.

In some implementations, a crawling and subsequent indexing occur during the first time a communication corpus is pointed at the system. The indexing and crawling may be redone at the users' discretion or automatically at some interval or based on other factors.

In some implementations, new hyperlinks sent or received may be followed and indexed as the links are received or at regular intervals.

In some implementations, text from web pages may be displayed when keywords matching search keywords are found in the text of a webpage. In these implementations, the matching webpage text may be presented with associated metadata such as, for example, the website name, time of last updating, time of last indexing, author of the email containing the hyperlink, date the hyperlink was sent, etc. In one implementation, the webpage text matches may be displayed alongside email text matches, contact name or address matches, regular web search engine result matches and the like.

Adding or Removing Email Recipients from Messages Before Sending

In some implementations, the system may display visual cues before an email is sent to inform the participant of one, some or all of the individuals who may receive any given email. As an example, after a user clicks "reply all", writes a response, and sends the email, but before the message is actually sent, a list of pictures of the designated recipients may be displayed to the participant. This may be accomplished to reduce the number of unintended recipients on any given email. In one implementation, the list of recipient pictures may be displayed at anytime during the composition of a message after the recipient's email address has been entered.

In some implementations, the system may pull image information from different sources and associate the image information with a subject's person profile. Such sources may include, but is not limited to, social networking web sites, professional networking web sites, people search and information web sites, image submitted by the subject or the participant, employee directory systems and the like.

In some implementations, when the participant chooses a list of email recipients, the system renders a view to show the images of the recipients to provide a visual check for the participant to ensure that there are no unintended recipients on the list. One such implementation of a recipient image view may include a system side bar, but the system is not limited to such an implementation. If a recipient is an email group list, then a group icon may be shown instead of a person's image or an image of each person in the group may be displayed.

In some implementations, the system may require that the participant confirm each image as an intended recipient of the email prior to allowing the email client to send the message. The participant may confirm a recipient by clicking an indicator next to the recipient's image. In these implementations, the recipient image view may, for example, indicate which recipients are internal and external to the participant's organization, indicating which recipients are "highly sensitive" recipients (as defined by the user) (e.g., if the recipient list includes the CEO of a company, then the image view indicates to the participant that the CEO is part of the recipient list), or indicating which recipients are email group lists.

In some implementations, the system also may suggest other people the participant may want to include on an email. For example, if the recipient has an assistant carbon-copied on 80% of the emails he sends or receives, the system may recommend to the participant that he include the assistant in the CC field. This recommendation may be made when the original recipient's email address is entered into the "TO:" field or prior to sending the message. The additional suggested recipients may be displayed using pictures of the recipients or by listing their names.

Integrating Data from Multiple Email Clients and Displaying the Data in Multiple Email Clients or Desktop Applications or Websites In some implementations, the system may integrate a participant's work and personal email clients/accounts. When the system resides on a participant's work email client (e.g. Microsoft Outlook® client), it may provide an information feed from the participant's personal email client (e.g., Gmail®) to let the participant know he has received emails on his personal email client or give the participant access to historical communication data. The data from these multiple locations may be aggregated and be displayed together as part of the person profile (e.g., recent attachments shows all recent attachments sent from Jane to the participant's gmail account and their Outlook account). The data from these disparate sources may also be kept separate but made accessible within the same information display such as in implementations which utilize a sidebar. The information display may be stand alone or integrated with a particular email client or communication application (e.g., instant messaging, webmail, etc.). One example may include a web browser extension where the information display appears when the user enters the web address of an associated web mail account. The same data that is accessible through an information display in a desktop email client would then be visible when using a webmail interface.

In some implementations, the system may provide, without limitation, the following information together with an email attachment: subject title of email, sender, date and time sent, preview of the content in an email, a list of people related to a subject, contact information for a subject and the like. In some implementations, these information also may be displayed in other desktop applications or in a web browser so the participant may easily request information from the system while using these other applications.

In some implementations, content from the system may be automatically displayed when content from a webpage or application relates to content stored in the system. As an example, a participant visits the blog of Matt Smith, and the system recognizes the name of the author from the text of the webpage or from associating a person in the system with a specific web address (e.g., Matt Smith's signature always contains the blog's web address). The system may then provide information about the participant's relationship with the author such as "you haven't emailed Matt in 2 weeks", "The last conversation you had with Matt was . . . ", "Matt is currently available online using Skype", "You and Matt have 3 friends in common on Facebook", etc.

Displaying Web Content Related to Links Found in an Email

In some implementations, the system may extract web URL's present in emails received from a subject and add the extracted URL's to the subject's person profile information view.

In some implementations, the system may rank the URL's based on the frequency of occurrence in the emails received from the subject. In other implementations, the system may rank the URL based on the uniqueness of a URL as it relates to multiple URL's in an email or in all emails received from a subject.

In some implementations, the participant may update the list of web URL's associated to a subject. Alternatively, the participant may update the list of web URL's associated to his own system person profile.

In some implementations, the participant may hover over a web URL associated to a subject, and the system will automatically create a pop-up to let the participant preview the content related to the URL. In these implementations, previewing allows the participant to view, for example, without limitation, a web page, a "slideshow" of different pages of the textual document, an image with its original size and aspect ratio, an abbreviated "slideshow" of different pages of the Power point document, or play an audio file, an video file, a streaming video and the like. In addition, the system may use a thumbnail to represent the web URL. This thumbnail may include, without limitation, the homepage of a company webpage or a web site, the latest entry in a blog, a static frame of an online video, an online advertisement, a subject's social network or professional network public page and the like. If desired, the participant may hover over the thumbnail to launch a preview of the URL content.

Status Sharing

In some implementations, email status may be automatically determined from the activity of a user of the system. In these implementations, status indicators may indicate, without limitations, the number of emails a participant has sent or received during a time window, whether the participant has checked his email, whether the recipient has moved his mouse or entered keystrokes during a time period, the response time of the recipient to emails during a time window and the like.

In some implementations, the participant using the system may publish his/her current status to other subjects using the system. In these implementations, the participant's status may be visible only to other subjects who may be connected to the participant by, for example, emails exchanged in the past over the current email client or other email clients, a connection on professional networking site, a connection on social networking sites, membership to the same online group, a connection on a instant messaging system and an explicit system connection manually created between the participant and the subject.

In some implementations, the status information may be defined by the system. For example, the status information may include, without limitation, busy, away from the computer, out of the office, in a meeting, out of town, returning on "date DD/MM/YYYY", and computer generated statistics about the participant's email activity (e.g., "Matt has sent 10 messages in the last hour", "Matt hasn't sent or read a message in 2 days", etc.) and the like.

In other implementations, the status information may be defined by the participant or free text entered by the participant. In these implementations, the participant may choose to hide status information from specific/named subject(s) participants even though the participant and the subject(s) may be connected. Status information also may be subject-specific. For example, for subject Matt, Adam's status is "Available", but for everyone else, Adam's status is "Busy". Alternatively, status information may be subject-specific and automatically generated by the system. For example, the following information may be automatically generated by the system when a subject tries to reach a participant named "Aamir": "You've been trying to reach Aamir, and he has 10 unanswered emails from you. He's currently going through his emails and we expect that he will reply to your email soon/in less than 1 hr".

In some implementations, the system may show a subject's status on a social networking website or instant messenger or some other system that allows a user to set and show a sharable status. This may be achieved through an integration between this system and those other systems In some implementations, the status messages may be displayed continuously in a list of the subject's top contacts, status messages may be displayed next the name of a person when the subject looks at an email from them, or the status message may be displayed when the subject enters the person's email address in the compose window of an email message.

In some implementations, the status message may have configurable "calls to action". For example, when composing an email to Matt, the status message may be set up to say: "I'm going to be out of town until July 15$^{th}$, set a reminder to contact me on July 15$^{th}$ by clicking here" or " . . . delay the sending of this message until July 15$^{th}$ by clicking here".

In implementations in which a sender and a recipient are using the status message system, a sender may compose messages that would not be sent until some predetermined action has taken place on the recipient's system (e.g., upon the notification from the system that a participant is at his/her computer, the participant switches a status from one state "busy" to another state "available", the participant sends more than 10 message in one hour, or the participant reads more than 10 messages in one hour).

Payment, Banking and Remittance Support

In some implementations, the system may provide a side bar implementation of a payment, banking, and remittance information viewer and transaction support console.

In some implementations, an email address may act as a unique identifier for a payment and remittance system.

In other implementations, two or more individuals using the system may make payments between the systems without having to enter any additional login or credentials. In these implementations, payments may be made between systems without sending an email or encrypted payment information is sent in an file attached to an email which is recognized by the recipient's system and converted to a withdrawal or payment of funds. If a recipient receives a payment or payment request and isn't a user of the system, the recipient may be sent a hyperlink to a webpage where payments may be made and received.

Online Payment, Online Banking, and Remittance Information Related to Subjects In some implementations, the participant may view information related to online payment, online banking, and remittance information related to one or more subjects. For example, the participant may, without limitation: (1) view a list of online payment, online banking, and remittance systems that a subject uses; (2) view the preferred payment system(s) that the subject uses; (3) view the list of outstanding invoices or remittance requests received from and sent to the subject, (4) view the list of completed and pending payments and remittances that were made to or received from the subject; (5) view the total amount of payments sent to or received from a subject; (6) view the total amount of remittances sent to or received from a subject; (7) search and sort lists (where appropriate) based on, for example, viewing a list over a date range specified by the participant, sorting through a list by, but not limited to, date, amount, payment processing system, processing status, and sorting by transaction category or type; and (8) search for subjects based on, for example, subjects who have yet to make payments on invoices or sent money to fulfill remittance requests sent by the participant, subjects whom the participant has received outstanding invoices from or remittance requests from, subjects whom the participant has paid money or remitted money to, subjects who have in total (or over a period of time) paid or remitted money to the participant beyond a certain amount, and/or subjects who have total outstanding invoices or unfulfilled remittance requests beyond a certain amount.

Online Payment, Online Banking, and Remittance System Account Information Dashboard In some implementations, an online payment, online banking, and remittance system account information dashboard may be included. Through the dashboard, a participant may, without limitation: (1) view account related information with online payment, online banking, and remittance systems account on this system; (2) view the list of completed and pending money transfers (deposits and withdrawals) to the participant's accounts with online payment, online banking, and remittance systems; (3) view the participant's account balances with online payment, online banking, and remittance systems; (4) view, search and sort lists (where appropriate) including a list of system accounts sorted by account balances, a list of system account sorted by online system name and a list of system accounts sorted by system type (e.g. payment system, banking system, remittance system, etc.).

Originating Online Payment, Online Banking and Remittance Related Transactions In some implementations, the participant may conduct transactions supported by online payment, online banking, and remittance systems. These transactions may include, but are not limited to, transferring money to and from their accounts, making payments and remitting money to others, creating and sending invoices and remittance requests to others, and buying and selling investment instruments.

Integrating to Online Payment, Online Banking, and Remittance Processing Systems In some implementations, in order to support online payments, online banking and remittance transactions in the system, the system may support data, transaction and security integration with third party systems including, but not limited to, online payment systems, online banking systems, online money remittance systems and peer-to-peer lending systems. In these implementations, the system also may support a set of published Application Programming Interfaces (API's) and Web Services to enable these integrations.

Mobile Email Information System

In some implementation, the system may be extended to mobile phones to enhance existing email clients associated with the mobile phones.

In some implementations, a mobile version of the system may be used to facilitate multi-object search and browse for emails, people and attachments on existing mobile email clients. Participant may launch the system search mechanism directly from the existing phone email client or as a separate application on the phone.

In some implementations, a mobile version of the system may be used to extract, relate and present threaded conversations and people information on existing mobile email clients. The participant may switch to this system's information view directly from the email client's email content viewer by clicking on this system's icon on the email or selecting the appropriate menu option (to launch this system) on the email client while viewing the email.

In some implementations, these existing email clients may include, but are not limited to, flurry email clients, MovaMail clients and Google® and Yahoo® Mobile email clients.

In some implementations, contact information extracted from emails by the system may be synchronized with the phone's personal information management system or third party mobile product information management systems.

In some implementation, the system also may be extended to mobile phones to enhance existing Smart phone and PDA phone email clients.

In some implementation, a mobile version of the system may be used to facilitate multi-object search and browse for emails, people and attachments on existing smart phone and PDA phone mobile email clients. Participant may launch the system mechanism directly from the existing phone email client or as a separate application on the phone.

In some implementation, a mobile version of the system may be used to extract, relate and present threaded conversation, people, attachment, and contact information on existing smart phone and PDA phone mobile clients. The participant may switch to this system's information view directly from the email client's email content viewer by clicking on this system's icon on the email or selecting the appropriate menu option (to launch this system) on the email client while viewing the email.

In these implementation, existing email clients may include, but are not limited to, Blackberry® email clients, Motorola® Good clients, Palm Treo® email clients, Apple® iPhone email clients, Windows® Mobile email clients and Google® and Yahoo® Mobile email clients.

In some implementation, contact information extracted from emails by the system may be synchronized with the phone's personal information management system or third party mobile product information management systems.

In some implementation, the system may integrate with Blackberry enterprise server edition for Microsoft® Exchange, Lotus® Notes Domino, Novell® Groupwise to support the synchronization of Xobni® extracted information between the mobile and desktop clients. The system may also integrate with the enterprise/server editions of the Motorola® Good product suite.

In some implementation, the system may include its own data synchronization methods to ensure that desktop email clients are synchronized with mobile email clients. This applies to participants who are leveraging the enterprise/server editions of the Blackberry® or Motorola® Good product suites.

In some implementation, the system may include keyword search. The participant may search for people or keywords from their electronic communication mediums. Selecting a people result may pull up a person profile. The participant may use this to quickly view recent email conversations with the subject, recent appointments with the subject, a list of people related to the subject, contact information for the subject, attachments related to the subject, etc.

In some implementation, the keyword search may also be used to display keyword search matches from a communication medium corpus such as email, IM, transcribed voice calls, etc.

In some implementation, the searches for people or keywords may be done on the client mobile device using a local data store and processor or done on a webserver with a remote data store where the results transmitted back to the mobile device.

Email Store Analytical System to Enable Advertisement Targeting

In some implementation, the system may analyze emails in an email store that resides on a local email client, network server or an online email server to identify key attributes, habits, associations, activity profiles, current email client used and other relevant information about the participant and related subjects to enable advertisement targeting.

In some implementation, the system may create profile groups made up of anonymous participants whom advertisers may target advertisements at without revealing the identity of the participants. These profile groups may be created based on requirements dictated by the advertiser.

In some implementation, advertising effectiveness may be measured and different pricing models may be supported based on, without limitation, the number of impressions, the number of click-throughs, pay-per-action, pay-per-lead and other advertising metrics. In these implementations, the system also may support different pricing levels based on, but are not limited to, the time of day, the number of participants online at a specific time of day.

Collaborative Filtering and Recommendation Engine

In some implementation, the system may analyze a participant's email content and actions (e.g. clicking on web links and time spent on those website) to build a profile of the participant. Based on this profile, the system finds subjects with similar profiles, determines the most frequent content, websites and products collectively viewed/accessed/bought by these subjects, and then recommends these top content and web sites to the participant.

In some implementation, the system may leverage Collaborative Internet Discovery networks and Recommendations Engines like, but not limited to, those provided by Aggregate Knowledge, Inc. and Loomia, Inc., to recommend content, websites and products to the participant.

Communication Medium Store Access and System Integration

In some implementation, the system may provide a set of Application Programming Interfaces (API's) and Web services to allow other relevant systems to perform a set of activities on the system and the participant's communication information store (e.g., email, IM, social network data, etc.). These activities include, but are not limited: (1) querying and analyzing the participant's email store and system information (e.g., who they sent messages to today, who their top contacts of the month are, what domains they are sending emails to, etc.); (2) conducting transactions, synchronizing data, and synchronizing security access with the system (e.g., a participant may send a Facebook® friend request to subjects whom they have exchanged a certain minimum volume of emails with); (3) querying statistics; (4) querying participant status information (e.g., that was either created by the participant or the system); (5) querying the participant's current activity on the system (e.g., as to whether they are currently using the system based on keyboard and mouse movements, what application they are using the mouse pointer to click on, where on the application they are clicking, etc.); (6) querying the participant's implicit and explicit social network (e.g., implicit social network may include for example anyone the participant has sent and received more than 20 messages from whereas explicit social network may include those the participant has identified manually as connection, friend, co-worker, etc.); and (7) querying the text and metadata associated with emails, IMs, transcribed phone calls, etc that is stored and used by the system.

In some implementation, these API's and Web Services may provide the means for other systems to extract Transcript information generated by the system.

Figure 2:
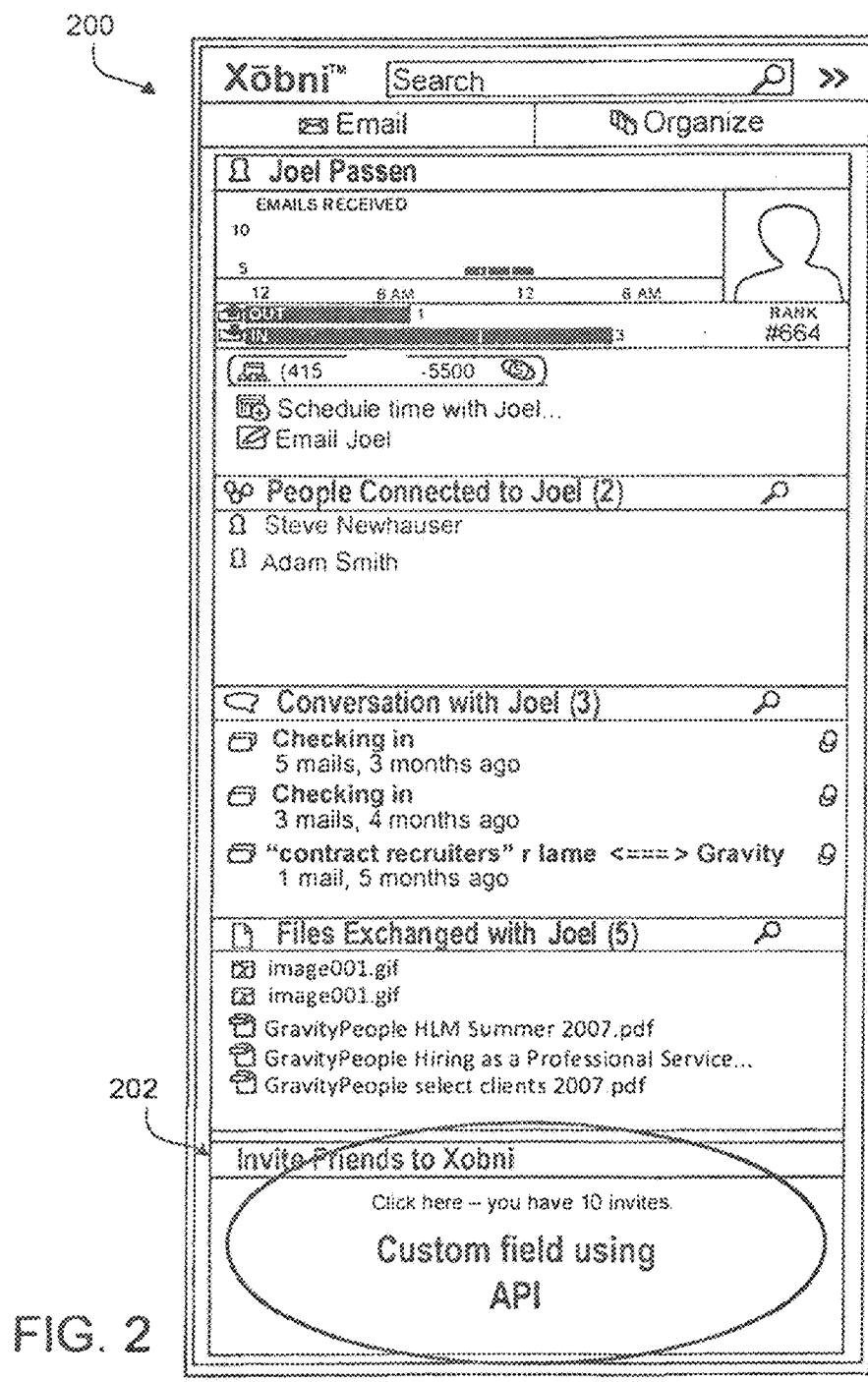
FIG. 2 shows an example API that integrates a user interface of a third party application called "invite friends to Xobni."

In some implementation, the API's also may allow a third party system to access the interface by which the system displays data and information to the user. One instantiation of this interface may include a sidebar. The third party system may add display areas to the sidebar which may be cued on user clicking or typing actions (such as selecting an email or typing a search query). The third party system may add new text, buttons, pictures, etc. to existing sidebar display areas. The third party system may add new menu items to the system menus. The third party system may also add visual elements to displays of the system information displayed in a web interface. FIG. 2 shows an example API 200 that integrates a user interface 202 of a third party applications called "invite friends to Xobni."

Email Analytics to Support Decision-Making and Email Triage

In some implementation, the system may group emails into groups and rank these groups based on the number of unread emails. For example, the participant may view a ranked list of subjects (e.g., the ranking may be done based on the number of unread emails from the subject); the participant may view the ranked list of projects/tasks (e.g., the ranking may be done based on the number of unread emails associated to the project/task); the participant may view the ranked list of departments in the organization (e.g., the ranking may be done based on the number of unread emails coming from employees of the different department); and the participant may view the total number of emails from all internal and all external subjects that are in the queue to be read by the participant.

In some implementation, for each of the analytical views discussed above, the participant may "drill-down" to the details (i.e. the list of emails or the specific email). For example, the participant may see that there are 30 unread emails from external subjects versus 2 unread emails from internal sources. The participant may click onto the "30" unread external emails, and see the list of emails, and may also click into each email. This may facilitate a data analytical approach to triaging a participant's unread emails.

Improvements to Person Profile

In some implementation, the system may support a participant in performing activities related to, without limitations, email triage, viewing people connections etc. For example, from the person profile view, the participant may view which messages from a subject have been read or which are still unread. The participant also may mark a message or all messages from a subject as having been read. The participant also may view the list of all subjects that have been carbon copied on the email, and clicking a subject may take the participant to that subject's person profile page. If desired, the participant also may click (or some other appropriate action) on a subject's name listed in the body of the email or in the header of the email, and the system may open the person profile page for that subject.

Action Area for Current Email

In some implementation, the system may provide an "Actions" area in the system that allows the participant to undertake certain actions with the current email that is being viewed on the email client. One such implementation of this "Actions" area is in the sidebar implementation where an "Actions" area may be included with the person profile page. The participant may file current email to a folder suggested by the system, forward an email that is contained/attached in the current email and forward attachment(s) that is contained/attached in the current email.

Actionable Web Feeds

In some implementation, the system may be extended to the web feed feature previously described to provide the participant with ways to act on email content. The following are some samples, and hence are not limiting in nature: (1) an ISBN number where the system may provide a link to the page on amazon.com that has the information for the item; (2) web page link where the system may show a thumbnail of the web page that the participant may click to open in a browser screen; (3) EBay email where the system may provide a "View this auction page" action link; (4) a UPS tracking number where the system may provide a "Track this package" action link; (5) an Amazon receipt—the system may provide a "View this order page" action link; (6) YouTube® video where the system may provide a "Play Video" capability; (7) a MP3 link where the system may provide a "Play Audio" capability; (8) a LinkedIn® invitation where the system may provide the means for the participant to accept a friend invitation without having to go to the LinkedIn site; and (9) Facebook email where the system may show a message from an acquaintance or what an acquaintance may have written on the participant's Facebook wall without the participant having to go to the Facebook site.

Search for Actionable Email Content

In some implementation, the participant may search for email content to act on. For example, the participant may search for phone numbers in emails, and the system may return a search result list of numbers. From this list, the participant may click a number to call it via a Voice Over Internet Protocol (VOIP) phone client or other soft phone clients. The participant may also choose to save the phone number to an existing contact or to create a new contact As another example, the participant may search for physical addresses in emails, and the system may return a search result list of addresses. From this list, the participant may click an address and the system will open an online mapping system (such as Google Maps) to locate the address on the map. The participant may also choose to save the address to an existing contact or to create a new contact.

As yet another example, the participant may search for calendar event invitations (e.g. Microsoft Outlook event invitation), and the system may return a search result list of calendar event invitations. From this list, the participant may accept or reject the invitation.

As yet another example, the participant may search for appointment related information, and the system may return a list of emails that contain information that suggest the creation of an appointment, and the system will recommend creating an entry in the participant's calendar. The participant may create a calendar entry for a specific email directly from the search results list.

Calendar and Task Information Related to a Person

In some implementation, the participant may create and view "To-Do" tasks related to a subject as part of the Person Profile information. The participant also may view calendar appointments or events that are related to a subject. The system may associate a calendar appointment with a subject because either the subject created the appointment/event or is an invitee to the appointment/event. The system may show the upcoming appointments/events, their locations and time, or visually indicate (e.g. by flashing the appointment) to the participant that an appointment/event is coming up (e.g. 10 minutes before it starts). The participant may view when the subject (or person) is available or busy, or invite the subject for an appointment/event directly from the person profile information view.

Email Triage Service and Machine Learning

In some implementation, the system may provide an email triage service that presents to the participant within a participant-defined amount of time (e.g. 30 minutes) emails that may need attention. Over time, the system may learn about the types of emails that may need the participant's attention. As part of the learning process, for each email presented to the participant during the triage time period, the participant may reply to the email, may come back to it later, or decide not to attend to the email. From these responses/actions, the system may continue to get better at presenting the most important emails to the participant.

In addition, the participant may select and provide a set of past emails that will serve as "training data" for the system. The combination of mining the training data and learning from experience may give the system an accurate assessment of which emails need the most attention from the participant.

As part of this service, the system may provide email templates for standard responses. The system may predict the type of response (e.g. getting back in touch, apology for a late response etc) that an email might need, and propose an email response template that the participant may use and modify for the participant's purpose. The participant may choose to use the email triage service on an ad-hoc basis or to schedule it as an ongoing event (e.g. at 5 pm every Friday).

Email Client Menu and Function Finder

In some implementation, the system may provide a search and browse mechanism to help the participant search for and find a menu item or function supported by the email client that may be difficult to find or that the participant may have forgotten where it was located. The participant may perform activities including, without limitation, using keywords to search for the menu or function; browsing the categories of different menus and functions; and drilling down to the specific menu or function the participant is looking for (e.g., the system may organize the email client's menus and functions into easily identifiable and navigable categories); and saving some email client menus and functions as the most important ones and these will show up as a list in the search and browse mechanism page without the participant having to conduct a search or to browse to look for them.

SMS Notification for Important Emails

In some implementation, when an important email arrives for the participant, the system may send a SMS (short message service) message to the participant's cell phone. In these implementation, the participant may designate emails from specific subjects as important. In addition, similar to the email triage service, the system may decide which emails (and by implication the types of content) are important to the participant. The system may learn from experience and from mining a training data set provided by the participant. When a system decides that an email is important, it may send an SMS message to the participant's cell phone, and the participant may respond with a "Yes" or "No" via a SMS message to indicate whether the email was important.

Quick Email Content Sharing

In some implementation, the system may provide a "sharebox" mechanism where participants may drag and drop emails or other content: attachments, contact information, pictures, etc. Such content may be automatically published to Wikipedia® sites, online blog sites, RSS widgets, social and professional networking sites, content syndication and distribution sites and mechanisms, or shared with other users in the same group or organization.

In some implementation, content may be displayed in a ticker or "news feed" residing on the system (or email client) of other subjects who are connected to the participant via a social network site, professional network site, subscription to the participant's content feeds, an organization affiliation, and other connection means. Permissions also may be set so that content may be shared only with select individuals, other users of the system, "friends" as identified by users on the system, "coworkers" as identified by email address or directory service, "friends" as identified by existing social networks or professional networks and the like. Content also may be sent between individual systems or a central server, or alternatively pushed onto individual systems where the content appears automatically. Of course, if desired, the content also may be pulled only when a users request data, such that sharebox updates may create notifications that may be sent as emails or other methods of notification.

Adding Person Notes

In some implementation, the participant may add free text notes related to a person (i.e. subject). These notes may be exported to other desktop application systems such as, without limitation, Microsoft® Excel, Word, and other text processing applications. In addition, these notes may also be added to on-premise and hosted CRM systems and associated with the customer or partner record in the CRM system. In some implementation, these notes also may be shared with other subjects using the system. The participant may decide which subjects to share these notes with.

Manual and Auto Email Tagging

In some implementation, the participant may manually tag emails using free text terms. The system may also automatically tag the email based on an analysis of the email content. These tags may be used to facilitate the search for emails or to provide an email grouping mechanism to facilitating the participant in browsing these groups to find the email(s) the participant is looking for.

Contact Information Sharing

In some implementation, the participant may click on a "Send Contact Information" action mechanism, and the system may automatically create an email with a "send contact information" content template and the person's contact information. The participant may modify the email content before sending the email. This feature facilitates email introductions between people.

Analyzing Participant Preference

In some implementation, the system may infer the preferences (i.e., likes and dislikes) and inclinations of the participant and subjects by analyzing the email messages and attachments that they send and receive. The system may parse email content and relevant attachments to locate text such as, without limitation, "I like", "I prefer", "I have", "I want", "I was concerned" and "I was annoyed".

In some implementation, the system also may develop profiles about the participant or subjects. Such a profile may be used to recommend content, products, services and activities to the participant and subjects. Likewise, such profiles may also be used by the system to understand what the participant and subjects already have, use or do, and the system may leverage these people to serve as recommenders or feedback providers for this content, product, services and activities. The system may harness these people to create a new consumer/people influence channel for this content, product, services and activities.

In some implementation, the system may harness this group of people as a source of information to drive, for example, product development, service development, policy development, process development, content development, etc.

Analyzing Participant Intent

In some implementation, the system may analyze the participant's activities to identify the goal of the participant. For example, if the participant starts a search for the word "matt", then the system changes to a person profile for Matt. If the participant starts a search for "matt budget", the system displays an interface showing all the attachments and emails with the word "budget" that were sent or received from Matt.

If a user is observed filtering messages from Matt, then filtering messages from Matt that contain an attachment, and then searching inside those attachments for the word "budget", the system may suggest a search command to the user such as "matt budget" that would retrieve the information more quickly.

Example Processes

Figure 3:
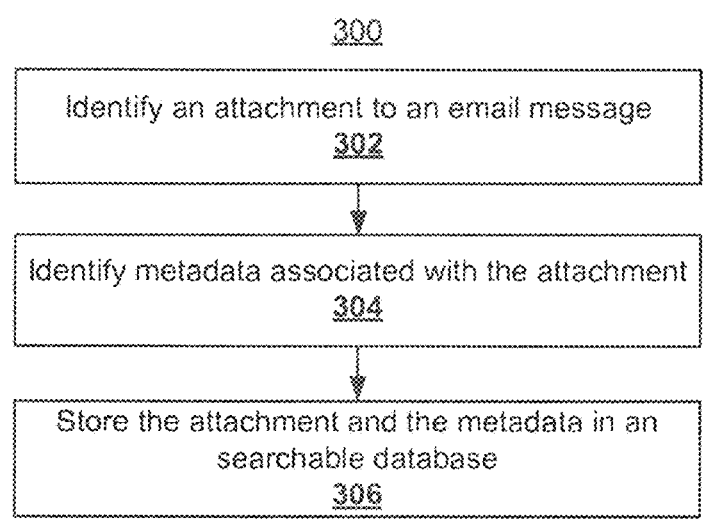
FIG. 3 shows an example process for storing an attachment and associated metadata in a searchable form.

FIG. 3 is an example process for storing an attachment and associated metadata in an searchable form. The process 300 may be performed, for example, by a system executing the attachment view 100, and for clarity of presentation, the description that follows uses such a system as the basis of examples for describing the process 300. However, another system, or combination of systems, may be used to perform the process 300.

Process 300 begins with identifying an attachment to an email message (302). Metadata associated with the attachment may be identified (304). The attachment and the metadata may be stored in an searchable database (306).

In some implementations, a query associated with an attachment may be received. Upon receiving the query, the attachment may be located. Then, information associated the attachment (e.g., a preview of the attachment) may be displayed.

In some implementations, the identification of an attachment to an email message may include the identification of an email thread associated with the attachment; the determination of whether the email thread includes one or more additional attachments; and if it is determined that the email thread includes one or more additional attachments, consolidation of the attachment, the metadata and the email thread including the one or more additional attachments.

In some implementations, a collaboration history associated with the attachment using the metadata also may be determined.

In some implementations, storing the attachment and the metadata in an searchable database may include storing the collaboration history in the searchable database, the collaboration history being established based on one of an analysis of the metadata, content changes associated with the attachment, tracking of one or more copies of the attachment, or one or more content comparisons between the attachment and one or more similar attachments residing in the searchable database.

In some implementations, a voting status associated with the attachment also may be received. The voting status may be indicative of a characteristic of the attachment. Additionally, the identification of the metadata associated with the attachment may include the identification of the voting status, and the storage of the attachment and the metadata in an searchable database may include the storage of the attachment, the metadata and the voting status in the searchable database.

In some implementations, the attachment or email message may be parsed to identify one or more keywords. In some implementations, a personal profile for a user based on the one or more identified keywords may be developed. In some implementations, content (e.g., advertising content) may be presented to the user based on the personal profile.

In some implementations, one or more user queries may be received. The one or more user queries may include one or more search terms. In some implementations, at least one attachment associated with the one or more search terms may be identified. The identified attachment then may be displayed.

In some implementations, a recipient of the email message may be informed as to whether a sender of the mail message is internal or external to a group associated with the recipient.

In some implementations, an email attachment information view configured to present content of an attachment may be provided. In some implementations, a preview of the attachment may be displayed through the email attachment information view.

In some implementations, one or more related email attachments associated with the attachment may be identified based on one or more predetermined criteria. In some implementations, the attachment and the related email attachments may be presented to a user.

In some implementations, identifying one or more related email attachments associated with the attachment may include identifying one or more email threads associated with the attachment; and identifying one or more related email attachments contained in the one or more identified email threads.

In some implementations, one or more search queries may be received. In some implementations, in the searchable database, one or more attachments associated with the one or more search queries may be retrieved. In some implementations, the one or more retrieved attachments may be presented to a user.

In some implementations, receiving one or more search queries may include receiving one or more search queries specifying at least one of a date range, a sender, a recipient or an attachment type.

In some implementations, one or more attachments stored in the searchable database may be categorized. In some implementations, the one or more categorized attachments may be ranked based on one or more predetermined criteria.

In some implementations, one or more attachments stored in the searchable database may be selected. In some implementations, a document comparison between two related selected attachments may be performed. In some implementations, a difference between the two related selected attachments may be identified.

In some implementations, content on a web page that is linked to or from within an email may be identified. In some implementations, the content in a searchable database may be aggregated. In some implementations, an action of a user that relates to the content in the searchable database may be identified. In some implementations, the related content may be retrieved and the retrieved content may be presented to the user.

In some implementations, content outside the webpage may be identified. In some implementations, retrieving the related content may include retrieving the identified content outside the webpage, and presenting the related content to the user may include presenting the related content and the identified content to the user.

In some implementations, a time period in which one or more messages are to be monitored may be identified. One or more user actions of a user associated with the one or more messages may be monitored. Training data based on the one or more monitored user actions may be developed. One or more subsequent messages may be presented to the user based on the training data.

In some implementations, monitoring one or more user actions of a user associated with the one or more messages may include determining which of the one or more messages are important to the user based on the one or more monitored user actions; and identifying one or more characteristics associated with the determined messages.

In some implementations, determining which of the one or more messages are important to the user based on the one or more monitored user actions may include querying the user as to which of the one or more messages are important.

In some implementations, querying the user may include sending a short message service (SMS) text to a mobile device associated with the user.

In some implementations, developing training data based on the one or more monitored user actions may include developing training data based on the one or more identified characteristics.

In some implementations, presenting one or more subsequent messages to the user based on the training data may include identifying one or more messages among the one or more subsequent messages that contain the one or more identified characteristics; and presenting the one or more identified messages to the user.

In some implementations, a template may be provided based on the training data for responding to one or more subsequent messages.

In some implementations, a computer-readable medium may be provided. The computer-readable medium may include instructions stored thereon, which, when executed by a processor, causes the processor to perform operations comprising: displaying a sidebar tool to facilitate a selection of an message attachment information view and a personal profile information view; displaying content associated with one or more message attachments when the message attachment information is selected; and displaying personal or public data of one or more users associated with the one or more message attachments when the personal profile information view is selected.

In some implementations, operations 302-306 may be performed in the order listed or in parallel (e.g., by the same or a different process, substantially or otherwise non-serially) to achieve the same result. Also, the order in which the operations are performed may depend, at least in part, on what entity performs the method. Operations 302-306 also may be performed by the same or different entities or systems.

Advertising Management System Architecture

Figure 4:
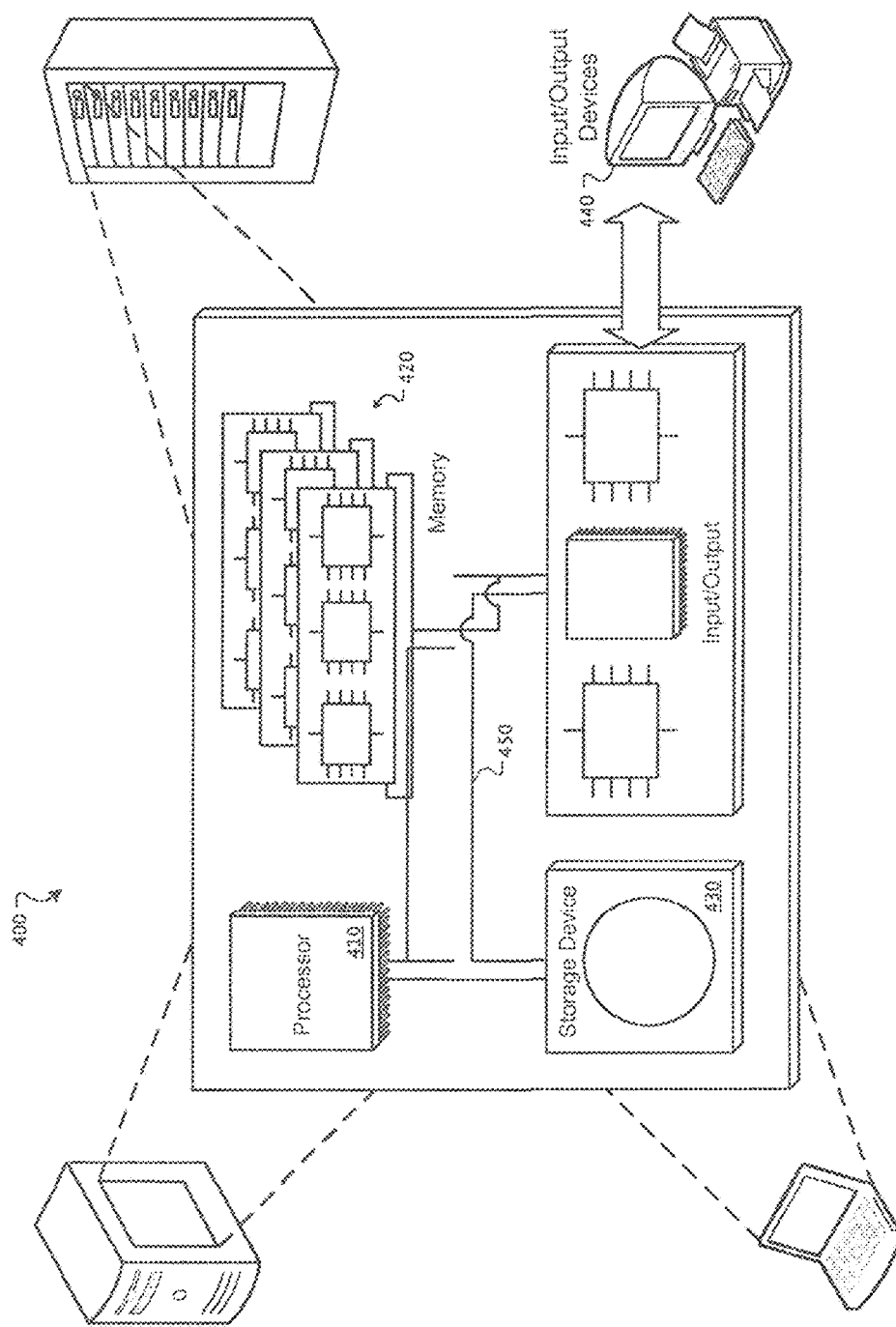
FIG. 4 shows an example generic computer architecture that may be used to execute the process shown in FIG. 3.

FIG. 4 is a schematic diagram of a generic computer system 400. The system 400 may be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 (e.g., dual-core Intel® Xeon® Processors) is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

In some implementations, the system 400 also may include one or more repositories, one or more network interfaces, an optional administrative computer and one or more computer-readable mediums (e.g., RAM, ROM, SDRAM, hard disk, optical disk, flash memory, etc.). These components can exchange communications and data over one or more communication channels, which can include various known network devices (e.g., routers, hubs, gateways, buses) and software (e.g., middleware) for facilitating the transfer of data and control signals between devices.

The term "computer-readable medium" refers to any medium that participates in providing instructions to a processor for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium further also may include an operating system (e.g., Linux server, Mac OS® server, Windows® NT server), a network communication module, and the like.

The operating system used by the system 400 can be multi-user, multiprocessing, multitasking, multithreading, real-time and the like. The operating system can perform basic tasks, including but not limited to: recognizing input from and providing output to the administrator computer; keeping track of files and directories on computer-readable mediums (e.g., memory or a storage device); controlling peripheral devices (e.g., repositories and 509); and managing traffic on the one or more communication channels.

The features described herein can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The network communications module includes various components for establishing and maintaining network connections (e.g., software for implementing communication protocols, such as TCP/IP, HTTP, Ethernet, etc.).

The disclosed embodiments can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A number of embodiments of the invention have been described. Nevertheless, it will be understood that various modifications may be made without departing from the spirit and scope of the invention.

What is claimed is:

1. A method comprising:
   identifying a time period in which first messages are to be monitored;
   monitoring one or more user actions of a user associated with the first messages, wherein the first messages are received from subjects, and the first messages each include at least one attachment;
   developing, by a processor, training data based on the one or more monitored user actions;
   learning, by the processor and based on the training data, types of responses of the user;
   analyzing the at least one attachment for each of the first messages including parsing the at least one attachment to locate text;
   inferring preferences of the subjects based on the analyzing to provide subject profiles;
   receiving, by the processor, a second message subsequent to the first messages;
   predicting, by the processor, based on learning the types of responses of the user, a first type of response to the second message;
   providing, by the processor, a template for preparing a reply to the second message, wherein providing the template is based on predicting the first type of response, and wherein content of the template is based on at least one of the subject profiles; and
   presenting, by a display, the template to the user, wherein the template is presented for modification of the reply prior to sending the reply to the second message, and the modification is made in response to user input received from the user in a messaging client.

2. The method of claim 1, wherein the monitoring one or more user actions of the user associated with the first messages includes:
   determining which of the first messages are important to the user based on the one or more monitored user actions; and
   identifying one or more characteristics associated with the determined messages.

3. The method of claim 2, wherein the determining which of the first messages are important to the user based on the one or more monitored user actions includes:
   querying the user as to which of the first messages are important.

4. The method of claim 3, wherein the messaging client executes on a mobile device associated with the user, and wherein the querying the user includes sending a short message service (SMS) text to the mobile device.

5. The method of claim 2, wherein the developing training data based on the one or more monitored user actions includes developing training data based on the one or more identified characteristics.

6. A non-transitory computer-readable medium having instructions stored thereon, which, when executed by a processor, cause the processor to perform operations comprising:
   identifying a time period in which first messages are to be monitored;
   monitoring one or more user actions of a user associated with the first messages, wherein the first messages are received from subjects, and the first messages each include at least one attachment;
   developing training data based on the one or more monitored user actions;
   learning, based on the training data, types of responses of the user;

analyzing the at least one attachment for each of the first messages including parsing the at least one attachment to locate text;
inferring preferences of the subjects based on the analyzing to provide subject profiles;
receiving a second message subsequent to the first messages;
predicting, based on learning the types of responses of the user, a first type of response to the second message;
providing a template for preparing a reply to the second message, wherein providing the template is based on predicting the first type of response, and wherein content of the template is based on at least one of the subject profiles; and
presenting, by a display, the template to the user, wherein the template is presented for modification of the reply prior to sending the reply to the second message, and the modification is made in response to user input received from the user in a messaging client.

7. The non-transitory computer-readable medium of claim 6, wherein the monitoring one or more user actions of the user associated with the first messages includes:
determining which of the first messages are important to the user based on the one or more monitored user actions; and
identifying one or more characteristics associated with the determined messages.

8. The non-transitory computer-readable medium of claim 7, wherein the determining which of the first messages are important to the user based on the one or more monitored user actions includes:
querying the user as to which of the first messages are important.

9. The non-transitory computer-readable medium of claim 8, wherein the messaging client executes on a mobile device associated with the user, and wherein the querying the user includes sending a short message service (SMS) text to the mobile device.

10. The non-transitory computer-readable medium of claim 7, wherein the developing training data based on the one or more monitored user actions includes developing training data based on the one or more identified characteristics.

11. A system comprising:
a processor executing a messaging client;
a display configured to present templates for modification based on user input to the messaging client; and
memory storing instructions configured to instruct the processor to:
identify a time period in which first messages are to be monitored;
monitor one or more user actions of a user associated with the first messages, wherein the first messages are received from subjects, and the first messages each include at least one attachment;
develop training data based on the one or more monitored user actions;
learn, based on the training data, types of responses of the user;
analyze the at least one attachment for each of the first messages including parsing the at least one attachment to locate text;
infer preferences of the subjects based on the analyzing to provide subject profiles;
receive a second message subsequent to the first messages;
predict, based on learning the types of responses of the user, a first type of response to the second message;
provide a first template for preparing a reply to the second message, wherein providing the template is based on predicting the first type of response, and wherein content of the template is based on at least one of the subject profiles; and
present, by the display, the first template to the user, wherein the first template is presented for modification of the reply prior to sending the reply to the second message, and the modification is made in response to user input received from the user in the messaging client.

12. The system of claim 11, wherein the monitoring one or more user actions of the user associated with the first messages includes:
determining which of the first messages are important to the user based on the one or more monitored user actions; and
identifying one or more characteristics associated with the determined messages.

13. The system of claim 12, wherein the determining which of the first messages are important to the user based on the one or more monitored user actions includes:
querying the user as to which of the first messages are important.

14. The system of claim 13, wherein the messaging client executes on a mobile device associated with the user, and wherein the querying the user includes sending a short message service (SMS) text to the mobile device.

15. The system of claim 12, wherein the developing training data based on the one or more monitored user actions includes developing training data based on the one or more identified characteristics.

* * * * *